April 6, 1937.   J. A. EADES   2,075,931
DUST RETURN HOPPER
Filed Jan. 6, 1936   2 Sheets-Sheet 1

Inventor
John A. Eades
By Eugene K. Purdy
Attorney

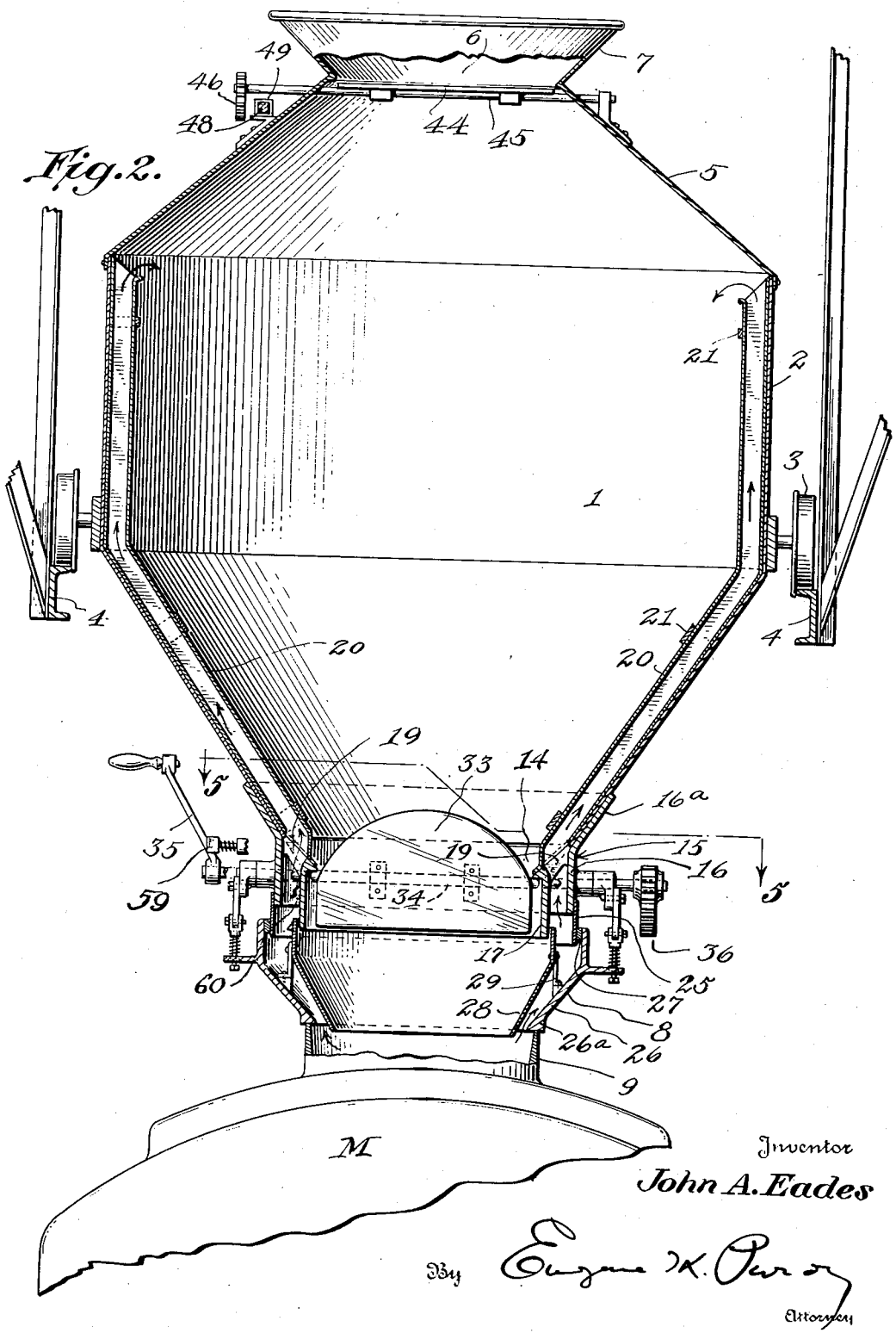

Patented Apr. 6, 1937

2,075,931

UNITED STATES PATENT OFFICE 2,075,931

DUST-RETURN HOPPER

John A. Eades, York, Pa., assignor to Read Machinery Company, Incorporated, a corporation of Pennsylvania Application January 6, 1936, Serial No. 57,826

11 Claims. (Cl. 214—35)

This invention relates to hoppers such, for example, as are particularly suited for charging mixing machines and other types of material working apparatus with powdery or light granular materials and incorporating means for preventing the escape of dust into the surrounding atmosphere.

More particularly the invention aims to provide a hopper of the above character in which a spout associated with the outlet of the hopper and providing an offtake venting to the top of the hopper is adapted to be placed in communication with the mouth of the apparatus being filled so that the suction created by evacuation of the hopper operates to draw the dust laden air from the interior of the apparatus into the top of the hopper.

Another object of my invention is to provide a hopper having a spout adapted to be lowered into fluid-tight engagement with the mouth of the apparatus being charged to prevent blowing of dust therefrom during emptying of the hopper. Movement of the spout, according to the preferred form of my invention, is advantageously effected by mechanism controlling the opening and closing of the discharge gates at the bottom of the hopper so that engagement of the spout with the apparatus occurs contemporaneously with the opening of the gates.

Still another object of the invention is to provide a hopper of the above character having an offtake designed to be placed in communication with the apparatus being charged and means operable upon release of the discharge gates at the bottom of the hopper to close the inlet at the top of the hopper. By this construction a partial vacuum is maintained above the level of material within the hopper which siphons the dust-laden air out of the apparatus into the top of the hopper.

Other objects and advantages will become apparent from the following detailed description of a preferred embodiment of the invention, reference being had to the annexed drawings, in which:

Figure 2 is an enlarged cross-sectional view of the hopper of Fig. 1 on the line 2—2 of that figure;

Figures 1, 3, 4, 5:
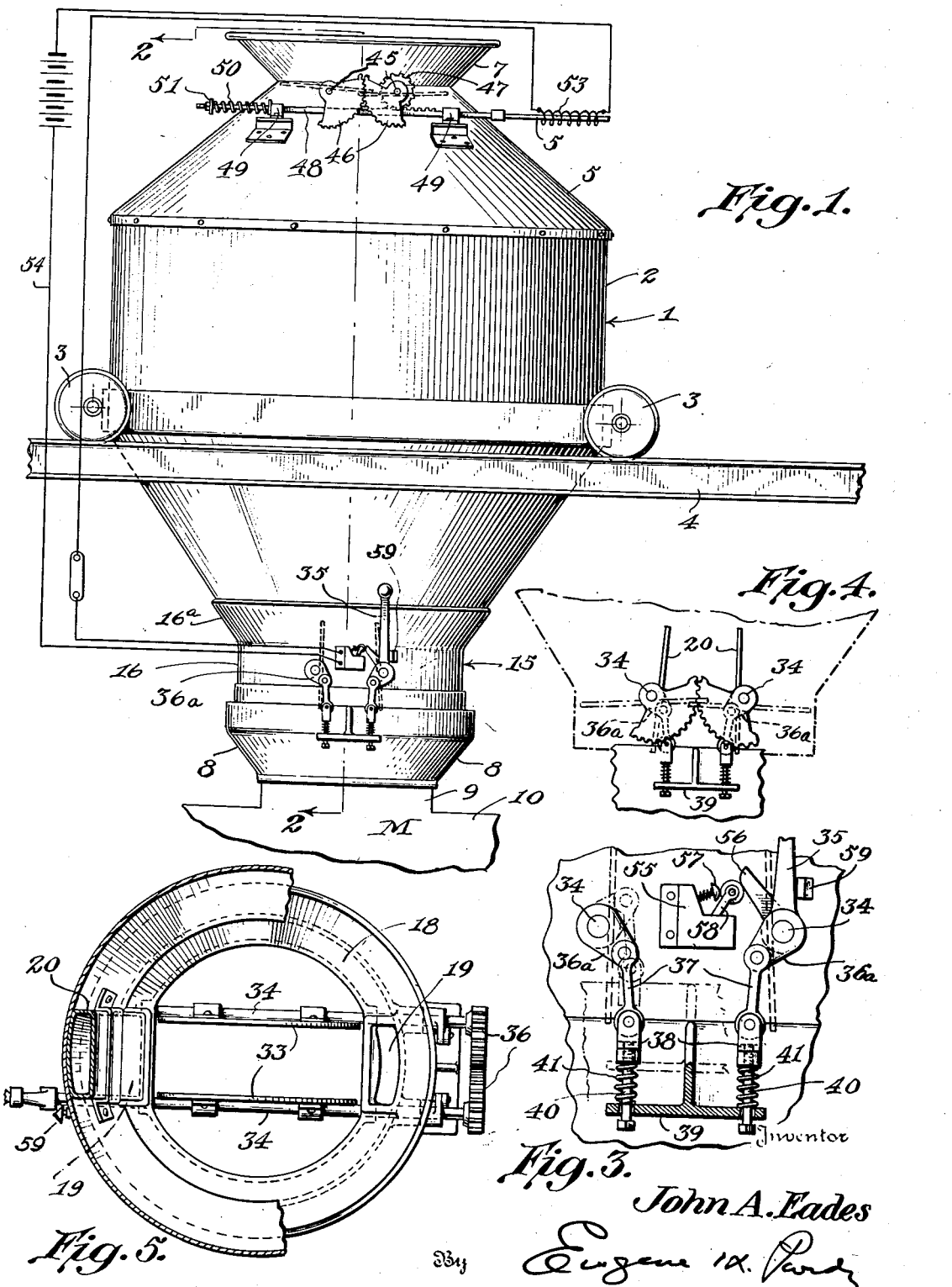
Figure 1 is a somewhat diagrammatic view in side elevation of a hopper suitable for use for charging mixing machines and incorporating the novel features of the invention.
Figure 3 is a detail showing of the gate and spout actuating mechanism viewed from one side of the hopper.
Figure 4 is a detail showing of the gate and spout actuating mechanism viewed from the other side of the hopper.
Figure 5 is a transverse cross-sectional view of the hopper on the line 5—5 of Fig. 2.

The charging hopper I represented in the drawings is of a type which finds useful application in large baking plants for introducing weighed quantities of flour and similar finely divided solids into the bowls of commercial dough mixing machines.

The hopper comprises a supply receptacle 2 made of heavy metal plate and supported intermediate its height upon rollers 3 engaging rails 4 of a track leading from a loading station, not shown, to a position above a mixer M. The top of the receptacle is closed by a cover plate 5 of frusto-conical shape which is centrally recessed to provide an inlet 6 through which material is loaded into the hopper and this inlet is surrounded by an annular rim 7. The lower end of the hopper converges downwardly within the space between the rails 4 and is provided at its bottom with a spout 8 which can be raised and lowered (as will be more fully described) from and into engagement with a neck 9 encircling the charging opening in a hood 10 arching over the top of the mixer M. Any conventional form of motive power may be employed for traversing the hopper along the track.

The lower end of the hopper terminates in a centrally disposed outlet 14. Surrounding this outlet is a casting 15 composed of a pair of cylindrical rings 16 and 17 arranged in concentrically spaced relation, the outer ring 16 being provided with an outwardly flared skirt 16a embracing and welded to the external face of the receptacle. The rings 16 and 17 are connected by a continuous web 18 (Fig. 5) sloping downwardly from the top of the outer ring 16 to the top of the inner ring 17 and closing the passageway between these rings. This web is slotted at diametrically opposed points to provide ports 19 opening into the space between the rings. Communicating with each of these ports 19 is a dust-return flue 20 of flattened rectangular cross-section secured by straps 21 to the inner wall of the receptacle and venting at the top of the receptacle at a point immediately below the cover plate 5 and above the normal level of the material adapted to be contained therein.

Fastened upon the lower end of outer ring 16 is a depending flange 25 upon which the spout 8 is arranged for limited up and down sliding movement. This spout is formed of a wall 26 having an upper cylindrical section which telescopes over the end of the flange 25, and a felt packing 27 surrounding the circumference of the flange seals the clearance space between these relatively slidable parts. The lower end of the outer wall converges inwardly and terminates in a foot 26a adapted to flatly engage the upper edge of the neck 9 of the mixer M when the spout is lowered. Similarly the spout includes an inner wall 28 held in spaced relation relative to the outer wall 26 by means of a plurality of brackets 29 extending intermediate these walls but which do not appreciably obstruct the passageway therebetween, which latter connects with the passageway between rings 16 and 17 in communication with the flues 20. As shown in Fig. 2, the upper end of inner wall 28 is of cylindrical shape so as to telescope over the lower end of inner ring 17, while the lower end of the wall converges downwardly and terminates a short distance below the outer wall 26. The inclination of the inner wall, however, is somewhat less than that of the outer wall so that the passageway between these walls becomes progressively smaller toward its lower end which is designed to establish communication with the interior of the neck 9 of the mixer.

The outlet 14 at the bottom of the hopper is closed by a pair of cooperating gates 33 mounted upon a pair of parallel shafts 34 which extend transversely through the outer and inner rings 16 and 17 in which they are rotatably journaled and have their ends extended beyond the circumference of the outer ring. The extended end of one of the shafts is provided with a hand crank 35, while upon the opposite end of the two shafts is mounted a pair of intermeshing gear segments 36, the arrangement being such that by turning the hand crank in one direction the shafts are rotated in reverse directions to swing the gates into open position, as indicated in Fig. 4. When the crank is turned in the opposite direction the gates are moved into partially overlapped relation, as indicated in dotted lines in this figure, closing the outlet 14.

The hopper is so constructed that, upon rotation of hand crank 35 to move the gates 33 to open and closed positions, the spout 8 is lowered and raised into and out of contact with the neck 9 of the mixer. This is accomplished by the following mechanism: The extended ends of the shafts 34 upon opposite sides of the casting 15 have fixedly secured thereto crank arms 36a (see Figs. 3 and 4), these cranks being correspondingly located upon the two shafts but disposed in reverse directions. Links 37 are swivelly connected to the free ends of the crank arms and these links project downwardly and are swivelly connected to the bifurcated heads of cap nuts 38. Upon opposite sides of the spout are laterally-extending shelves 39 having openings formed therethrough so as to freely pass the shanks of headed bolts 40 which latter extend vertically upward and have their threaded ends fastened in the cap nuts 38. Coil springs 41 encircle the shanks of these bolts and bear at one end against the cap nuts 38 and at their other end against the shelves 39. As indicated in Fig. 3, the crank arms 36 move from the dotted line positions to the full line position shown in the figure during opening of the gates 33 so as to compress the springs and resiliently hold the spout in fluid-tight engagement with the neck 9 of the mixer.

The inlet 6 at the top of the hopper is closed by a pair of gates 44, corresponding in all substantial respects to the gates 33 closing the outlet 14 at the bottom of the hopper. These gates 44 are fastened upon two parallel shafts 45 extending horizontally across the inlet. The shafts are rotatably mounted and are connected through intermeshing gear segments 46 (Fig. 1) fixed upon their extended ends exteriorly of the receptacle for effecting unitary movement of the shafts in opposite directions to swing the gates open and closed. For operating these gates, a pinion 47 keyed to the extended end of one of the shafts engages a rack bar 48 which is longitudinally slidable in guides 49 against the tension of a coil spring 50 interposed between a nut 51 on one end of the rack bar and one of the guides 49. The thrust of this spring tends to pull the rack bar to the left and retain the gates 44 in normally open position, while the opposite end of the rack bar is provided with a soft iron core 52 movable within a coil 53 and together forming a solenoid included in an electric circuit 54 as schematically indicated in Fig. 1.

In order to effect closing of the inlet gates 44 contemporaneously with the opening of the outlet gates 20 in the bottom of the hopper during emptying, a switch 55, indicated conventionally in Figs. 1 and 3, is provided in the electric circuit 54. A finger 56 upon the shaft 34 carrying the hand crank 35 for operating the outlet gates is so arranged that when the hand crank is initially swung in a direction to open the outlet gates, it rocks an arm 58 against a spring-pressed contact 57 to close the circuit 54, whereupon the rack bar 48 is shifted to the left to close the inlet gates 44. A spring detent 59 may be provided for retaining the hand crank against reverse movement, and a spring latch 60 located on the inner ring 17 to engage a lug on the inner wall 28 holds the spout in normally raised position.

In operation, the hopper having been loaded with flour or other material at a suitable loading station, is moved along the rails 4 until it is located above the mixing machine which is to be serviced. The hand crank 35 is shifted to the left (Fig. 1) to lower the spout 8 until the foot 26a engages the neck 9 of the mixer. This compresses the coil springs 41 which hold the spout in fluid-tight contact with the neck, reverse movement being prevented by the detent 59. Simultaneously, as has previously been described, the outlet gates 33 at the bottom of the hopper are opened allowing the flour to discharge through the tapered wall section 28 into the mixer, and the inlet gates 44 at the top of the hopper are closed to seal the top of the hopper. Lowering of the level of the flour in the top of the hopper creates a partial vacuum therein which draws the dust-laden air from the mixer up through the passageways between the outer and inner walls 26 and 28 of the spout and the outer and inner rings 16 and 17 of casting 15, into the flues 20 which vent to the top of the hopper. The course of the dust-laden air is indicated by the arrows in Fig. 2.

By virtue of this construction the air within the mixer is prevented from escape through the neck 9 of the mixer and the dust accompanying the discharge of the hopper, instead of being lost to the surrounding atmosphere, is returned to the hopper.

After the desired quantity of flour has been discharged into the mixer, the hand crank 35 is swung to the right to close the outlet and open the inlet of the hopper, at the same time restoring the spout to its elevated position clear of the neck 9. The hopper may then be moved along the rails 4 to a location above another mixer, or returned to the loading station for replenishing its supply of material.

It will be apparent that various changes in arrangement and design may be made in the preferred form of hopper described above without departing from the spirit of my invention.

I claim:

1. A charging hopper comprising a receptacle adapted to be supported in an elevated position, an inlet for material adjacent the top of the hopper and an outlet for material adjacent the bottom of the receptacle, closures associated with the inlet and outlet and movable to open and closed positions, an offtake member for dust-laden air adjacent the outlet and venting to the top of the receptacle, said offtake member being adapted to be placed in communication with an apparatus to be charged, and means for simultaneously opening the closure in the outlet and closing the closure in the inlet.

2. A charging hopper comprising a receptacle adapted to be supported in an elevated position, an inlet for material adjacent the top of the hopper and an outlet for material adjacent the bottom of the receptacle, closures associated with the inlet and outlet and movable to open and closed positions, a spout surrounding the outlet and providing a dust-return passageway venting to the top of the receptacle, means for opening the closure in the outlet and means operable by the last-mentioned means for closing the closure in the inlet.

3. A charging hopper comprising a receptacle adapted to be supported in an elevated position, an inlet for material adjacent the top of the receptacle and an outlet for material adjacent the bottom of the receptacle, closures associated with the inlet and outlet and movable to open and closed positions, a double-walled vertically-movable spout mounted upon the lower end of the receptacle, said spout forming an extension of the outlet and providing a dust-return passageway venting to the top of the receptacle and means for simultaneously actuating the spout and the closures in the inlet and outlet.

4. A charging hopper comprising a receptacle adapted to be supported in an elevated position, an inlet for material adjacent the top of the receptacle and an outlet for material adjacent the bottom of the receptacle, closures associated with the inlet and outlet and movable to open and closed positions, a double-walled, vertically-movable spout mounted upon the lower end of the receptacle, said spout forming an extension of the outlet and defining a dust-return passageway venting to the top of the receptacle and means for simultaneously lowering the spout, closing the closure in the inlet and opening the closure in the outlet.

5. A charging hopper comprising a receptacle adapted to be supported in an elevated position and having its lower end downwardly tapered, an inlet for material adjacent the top of the receptacle and an outlet for material adjacent the bottom of the receptacle, closures associated with the inlet and outlet and movable to open and closed positions, a double-walled, vertically-movable spout mounted upon the lower end of the receptacle, said spout forming an extension of the outlet and defining a passageway surrounding the outlet, a dust-return flue enclosed within the receptacle and extending between said passageway and the top of the receptacle, and means for simultaneously lowering the spout into tight engagement with the mouth of an apparatus to be charged and for closing and opening the closures in the inlet and outlet respectively.

6. A charging hopper comprising a receptacle adapted to be supported in elevated position and having a downwardly converging lower end, a charging inlet in the top of said receptacle, a discharge outlet opening through the lower end of the receptacle, a spout surrounding the discharge outlet, a dust-return passageway associated with the lower end of the spout, and an offtake member communicating with the dust-return passageway and venting to the top of the receptacle out of obstructing relation with said inlet, said offtake member being fixedly connected to the receptacle and forming a unitary part thereof.

7. A charging hopper comprising a receptacle supported in elevated position upon a horizontally traversable carriage and having a downwardly converging lower end, an inlet in the top of said receptacle, a discharge outlet opening through the lower end of the receptacle, a spout surrounding the discharge outlet, a dust-return passageway associated with the lower end of the spout, and an offtake member communicating with the dust-return passageway and venting to the top of the receptacle out of obstructing relation with said inlet, said offtake member being fixedly connected to the circumferential wall of the receptacle.

8. A charging hopper comprising a receptacle adapted to be supported in elevated position and having a downwardly converging lower end, a charging inlet in the top of said receptacle, a discharge outlet opening through the lower end of the receptacle, a spout surrounding the discharge outlet, a dust-return passageway associated with the lower end of the spout, and an offtake member communicating with the dust-return passageway and venting to the top of the receptacle out of obstructing relation with said inlet, said offtake member being fixedly supported upon the receptacle so as to form a unitary part thereof and extending internally thereof.

9. A charging hopper comprising a receptacle adapted to be supported in elevated position and having a downwardly converging lower end, a discharge outlet opening through the lower end of the receptacle, a spout surrounding the discharge outlet, a dust-return passageway associated with the lower end of the spout, and an offtake member communicating with the dust-return passageway and venting to the top of the receptacle; said offtake member being fixedly supported upon the inner circumferential face of the receptacle.

10. A charging hopper comprising a receptacle adapted to be supported in elevated position and having a downwardly converging lower end, a discharge outlet opening through the lower end of the receptacle, a spout surrounding the discharge outlet said spout defining a dust-return passageway surrounding said discharge outlet, and an offtake member communicating with said dust-return passageway and extending upwardly along the inner circumferential face of the receptacle and venting to the top of the receptacle.

11. A charging hopper comprising a receptacle adapted to be supported in elevated position and having a downwardly converging lower end, a charging inlet in the top of said receptacle, a discharge outlet opening through the lower end of the receptacle, a pair of vertically-disposed, concentrically spaced rings surrounding said discharge opening and defining an annular dust-return passageway, said passageway being closed at its upper end and open at its lower end, and a dust-return flue communicating with said passageway and venting to the top of the receptacle at an elevation below said inlet and out of obstructing relation therewith.

JOHN A. EADES.